United States Patent
Anstadt et al.

(10) Patent No.: US 6,361,161 B1
(45) Date of Patent: Mar. 26, 2002

(54) NANOPARTICLES FOR PRINTING IMAGES

(75) Inventors: George W. Anstadt, Pittsford; Dilip K. Chatterjee, Rochester; Donn B. Carlton, Hamlin, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/516,086

(22) Filed: Mar. 1, 2000

(51) Int. Cl.[7] .................................................. G01D 11/00
(52) U.S. Cl. ..................................... 347/100; 106/31.65
(58) Field of Search ......................... 347/100; 106/31.65

(56) References Cited

U.S. PATENT DOCUMENTS

| | | |
|---|---|---|
| 4,500,895 A | 2/1985 | Buck et al. |
| 4,794,409 A | 12/1988 | Cowger et al. |
| 4,849,774 A | 7/1989 | Endo et al. |
| 5,248,998 A | 9/1993 | Ochiai et al. |
| 5,311,218 A | 5/1994 | Ochiai et al. |
| 5,365,645 A | 11/1994 | Walker et al. |
| 5,527,386 A * | 6/1996 | Statz ........................... 106/481 |
| 5,598,196 A | 1/1997 | Braun |
| 5,600,357 A | 2/1997 | Usui et al. |
| 5,679,138 A * | 10/1997 | Bishop et al. ............ 106/20 C |
| 5,688,391 A | 11/1997 | Hayes |

OTHER PUBLICATIONS

Siegel et al, Annual Review of Materials Science, vol. 21, pp. 559–578, 1991.

* cited by examiner

Primary Examiner—John Barlow
Assistant Examiner—Michael S. Brooke
(74) Attorney, Agent, or Firm—Raymond L. Owens

(57) ABSTRACT

An image producing material which when deposited on a receiver produces an image comprised of nanoparticles selected to have an average diameter of less than 500 nm and arranged so as to be effective in two states, in a first state it aggregates and will not flow through an ink jet printer nozzle and in a second state when subject to a force is flowable so as to be deposited on the receiver, such nanoparticles being bound to each other by Van der Waals forces in the first state and after deposition on the reciever.

6 Claims, 6 Drawing Sheets

NANOPARTICLES FOR PRINTING IMAGES

CROSS-REFERENCE TO RELATED APPLICATION

Reference is made to commonly-assigned U.S. patent application Ser. No. 09/516,322 filed concurrently herewith, entitled "Apparatus for Using Nanoparticles for Printing Images" by Donn B. Carlton et al, the disclosure of which is incorporated herein.

FIELD OF THE INVENTION

This invention relates to flowable nanoparticles which can be used for printing images.

BACKGROUND OF THE INVENTION

Ink jet printheads are used to selectively eject ink droplets onto a receiver to form an image. Within the printhead, the ink may be contained in a plurality of channel members and energy pulses (either piezo or heat) are used to actuate the printhead channel members or the ink orifices causing the droplets, which form the reservoirs, of ink to be ejected on demand or continuously, through an orifice plate which is placed over the channel members.

In one representative configuration, a piezoelectric ink jet printing system includes a body of piezoelectric material defining an array of parallel open topped channel members separated by walls. In the typical case of such an array, the channel members are micro-sized and are arranged such that the spacing between the adjacent channel members is relatively small. The channel walls have metal electrodes on opposite sides thereof to form shear mode actuators for causing droplets to expel from the channel members. An orifice defining structure includes at least one orifice plate defining the orifice through which the ink droplets are ejected, and is bonded to the open end of the channel members. In operation of piezoelectric printheads, ink is directed to and resides in the channel members until selectively ejected therefrom. To eject an ink droplet through one of the selected orifices, the electrodes on the two side wall portions of the channel in operative relationship with the selected orifice are electrically energized causing the side walls of the channel to deflect into the channel and return to their normal undeflected positions when the applied voltage is withdrawn. The driven inward deflection of the opposite channel wall portions reduces the effective volume of the channel thereby increasing the pressure of the ink confined within the channel to force few ink droplets, 1 to 100 pico-liters in volume, outwardly through the orifie. Piezoelectric ink jet printheads are described in detail in U.S. Pat. Nos. 5,598,196; 5,311,218; 5,365,645; 5,688,391; 5,600, 357, and 5,248,998. Alternative ink jet print head configuration utilizes thermal energy to eject ink droplets from the orifices onto the receiver. Thermally activated ink jet print heads are described in details in U.S. Pat. Nos. 4,849,774; 4,500,895; and 4,794,409. This process of forming channel members, particularly in piezoelectric materials, is not only time consuming and expensive, but also is amenable to many defects generated during cutting the channel members or forming the channel members thereby reducing the throughput and increasing the unit manufacturing cost. Furthermore, mechanical damages caused during sawing or laser cutting also are detrimental to the piezoelectric characteristics of the material.

Another significant problem encountered in ink jet printing is the drying of the ink either inside the channels or at the orifice plates or at the orifices. To overcome this problem the ink formulators routinely compromise in ink formulations and the system designers incorporate wiper blades at the orifices or depend on ultrasonic devices to clean and remove the dried ink. Again, this introduces additional complicated system architecture and consequently increases the unit manufacturing cost.

Inks provide their own set of problems in ink jet printing, they are at all times flowable, thus subject to leakage, and may have storage problems, including limited shelf life. They also have a problem of drying and difficulty maintaining uniform viscosity since they can be temperature sensitive. Inks have been formed which have numerous ingredients such as dyes, pigments and colorants and nanoparticles (see U.S. Pat. No. 5,679,138). But, in all cases, the ink remains flowable in all states and subject to problems.

SUMMARY OF THE INVENTION

It is an object of the present invention to provide an improved material which is not a flowable ink that can be used for forming images.

This object is achieved by using an image producing material which when deposited on a receiver produces an image comprised of nanoparticles selected to have an average diameter of less than 500 nm and arranged so as to be effective in two states, in a first state it aggregates and will not flow through an ink jet printer nozzle and in a second state when subject to a force is flowable so as to be deposited on the receiver, such nanoparticles being bound to each other by Van der Waals forces in the first state and after deposition on the receiver.

It has been discovered that nanopaiticles which are effective in two states can be used to form images on receivers. Nanoparticlcs having an average diameter of less than 500 nm aggregate because of Van der Waals forces and are not flowable past an orifice in a first state but are flowable in a second state when a force as been applied to overcome the Van der Waals forces. A feature of the invention is that a stream of gaseous material, such as air, can be directed so as to cause the flow of Such nanoparticles towards the receiver.

The nanoparticle imaging materials used with this system have no vapor pressure and hence will not dry out and clog, eliminating the need for such complexity in the print head. The present invention provides a simple solution to ink clogging problems and facilitates the use of smaller orifices. Smaller orifices can provide greater resolution. Additionally, the speed of the ink jet printer system can be increased because there is 110 fluid component to the nanoparticle imaging materials which eliminates the need to wait for solvent drying on the receiver, a major limitation in ink jet printers.

DETAILED DESCRIPTION OF THE PREFERRED EMBODIMENT

Figure 1:
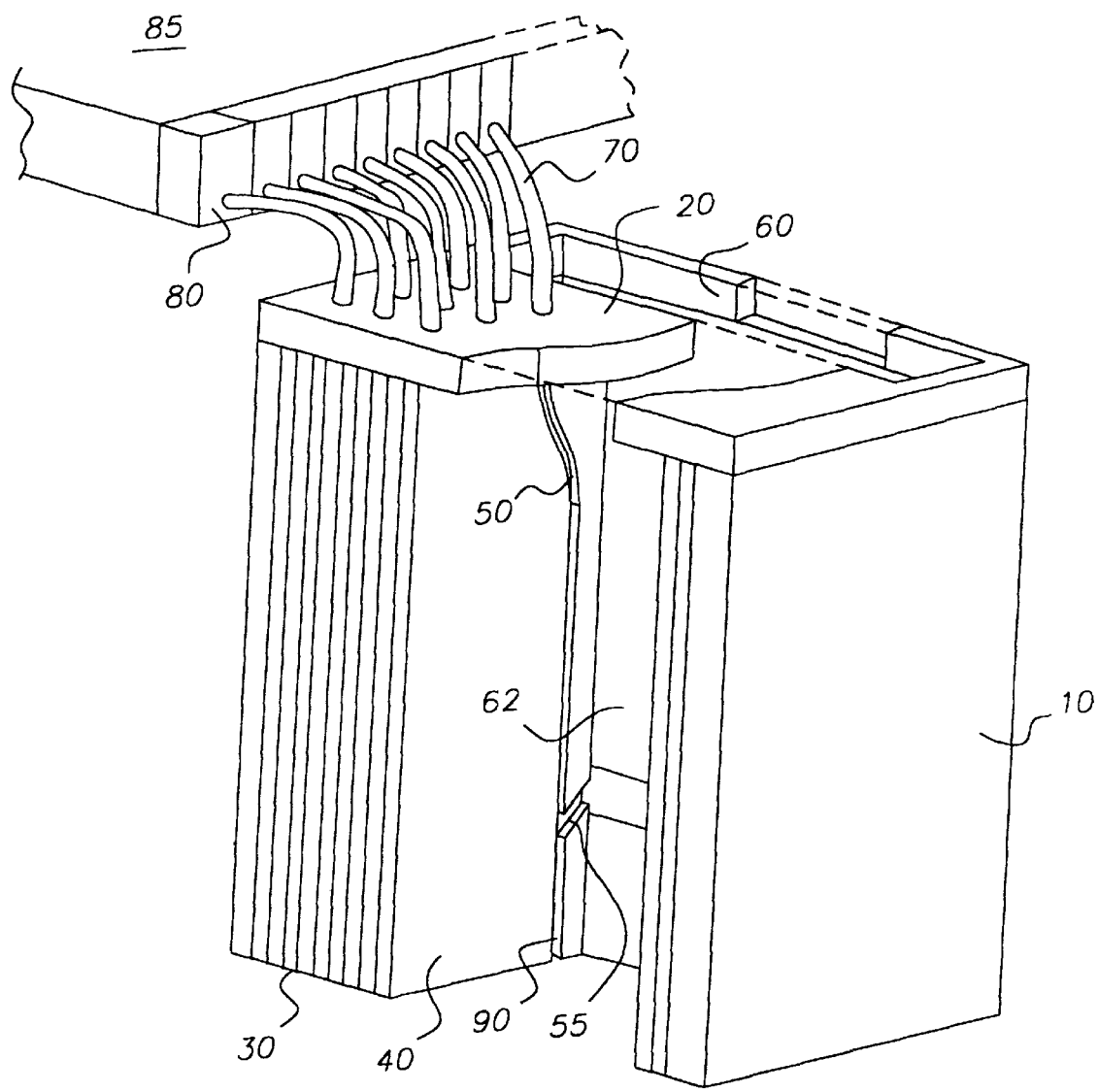
FIG. 1 is an enlarged partial isometric of an ink jet head that can be used in accordance with the present invention.
Figure 2:
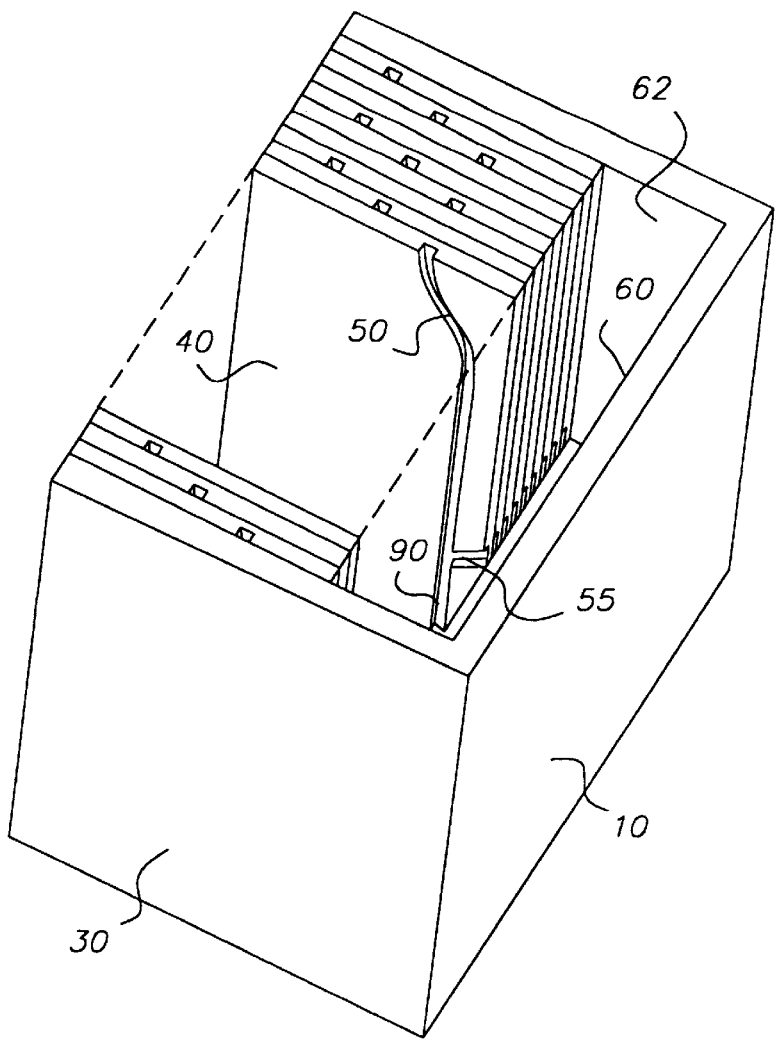
FIG. 2 is an enlarged isometric of the channels shown in FIG. 1 embedded on a thin wafer for nanoparticle delivery.
Figure 3:
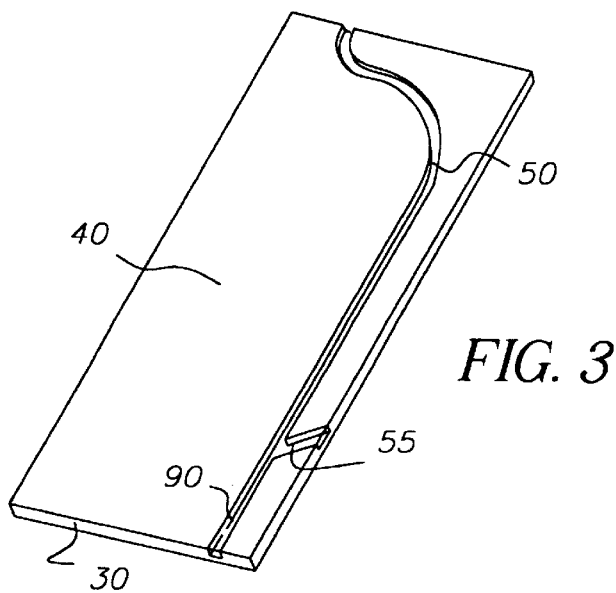
FIG. 3 is an enlarged partial isometric of the ink jet head of FIG. 1 with the top plate having air inlets to drive the ink system over the wafer assemblage.
Figure 4:
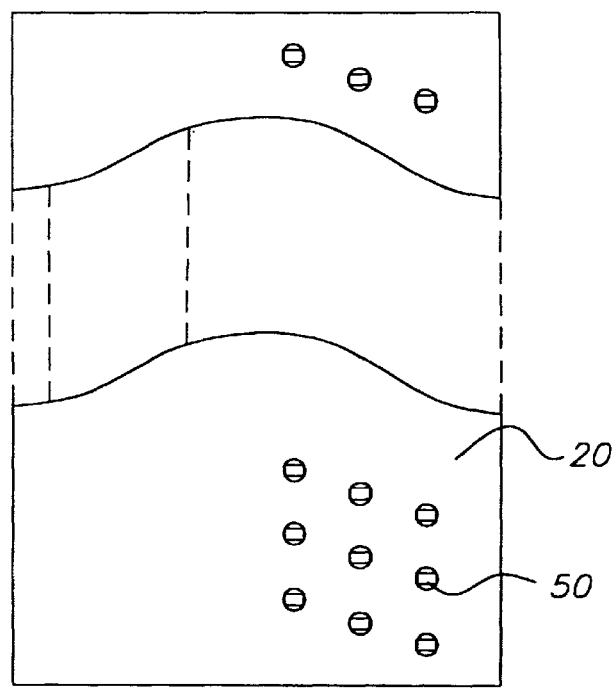
FIG. 4 is a plan view of the top plate having air inlets to drive the print system.
Figure 5:
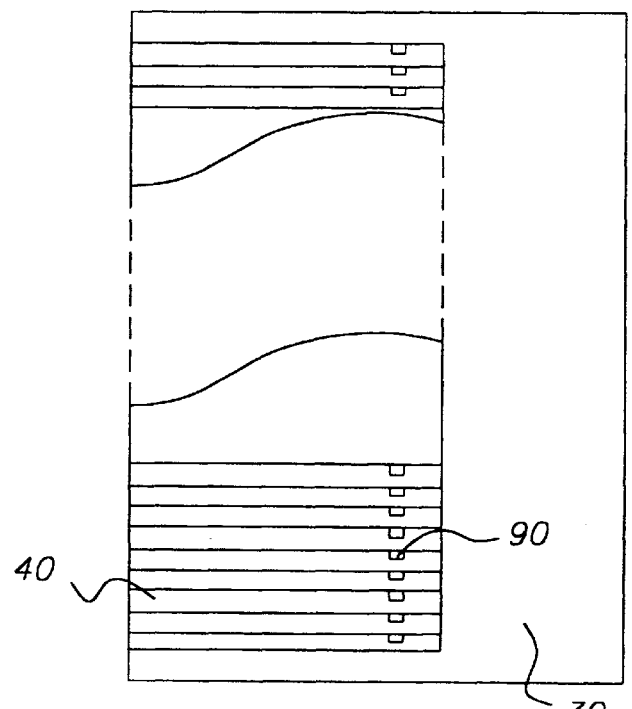
FIG. 5 is a plan view of the bottom plate of the head assembly showing orifices where the printing material exits to the print receiver.

Current ink jet technology is very capable, efficient and still improving in its design and in efficiency. Ink jet printing is expected to be the dominant form of image production, eventually replacing even offset printing for low and medium volume runs. Of the problems facing improvement in ink jet technology, the four major ones are the lack of image resolution, ink clogging, slow speed due in part to drying time for the solvent based inks, and increased manufacturing cost.

Ink is the most profitable consumable portion of ink jet printing,, and hence the greatest cost to the user over the life of a printer. An ink jet printer, which can use a wider array of inks, and inks with less stringent and hence less costly inks would be embraced by the marketplace.

Vibration of the proper frequency has a fluidizing effect on aggregates of particles. This principle can improve the performance of ink jet printing by preventing clogging of the ink jet head, by relieving clogging which has formed, and by increasing the fluidity of agglomerates of small particles which are serving as ink or colorants for the ink jet system.

Nanoparticles of metallic, non-metallic, and ceramic materials have received a significant attention in both basic and applied research areas. Nanometer sized powders and its aggregates find wide application in catalytic, sensor, filter, biomedical, aerosol, electronic, magnetic, and structural applications. By conventional sense, nanoparticles have diameters greater than 1 nm and less than 500 nm. However, from the interfacial atomic configuration, nanoparticles can be more appropriately, defined as the particles having diameters less than 100 nm.) The relative percentage of interfacial atoms to total atoms in a material increases dramatically with decreasing size below 500 nm (R. W. Siegel, 15 Annu. Rev. Mater. Sci., 21, pgs. 559–578, 1991). The resultant properties of materials of nanoparticle size thus have a much greater dependence on the contribution of interfacial atoms than material with submicron particles. Some of the unconventional (and also unusual) optical, magnetic, electrical, chemical, and mechanical properties of nanoparticle materials are usually attributed to this greater dependence on the contribution of interfacial atoms. The dominant interaction between nanoparticles in an aggregation not subject to significant amounts of added external energy is believed to be Van der Waals type interaction.

Conventional size reduction technology produces submicron particles that scatter visible light. Nanoparticles, however, are below the size-threshold where light scattering occurs. This property can be used with nanoparticles as image forming materials or as colorants (or pigments) to significantly narrow the spectral bandwidth of dispersed nanoparticles and increases its "color purity". Hence, dispersed nanoparticles and nanoparticulate pigments or colorants approach the spectral purity of dye-based system where the colorant is dissolved in liquid phase. In this discussion, the dispersion of nanoparticles can be both in solid and liquid states. In the case of solid state dispersion, inorganic nanoparticles of same or different color characteristics can be mixed together or inorganic nanoparticles can be mixed with organic nanoparticulate pigments or colorants. Alternatively, in the case of liquid phase dispersion, the above described mixtures are usually dispersed in water or some other solvents. A dye or a combination of dye can also be mixed with both solid and liquid dispersed nanoparticles. Particles larger than 500 nm can also be dispersed in an aggregate of nanoparticles: the dispersion will still behave as a fluid without any vapor pressure, even though composed entirely of solid particles, some of which are larger than 500 nm, thus allowing additional optical effects such as diffracting of light when desired.

In accordance with the present invention it has been discovered that nanoparticles which are effective in two states can be used to replace inks in ink jet printers. These nanoparticles are selected to have an average diameter of less than 500 nm and arranged so as to be effective in the two states, in the first state they aggregate and will not flow through an ink jet printer nozzle and in a second state when subject to a force they are flowable so as to be deposited on the receiver, such nanoparticles being bound to each other by Van der Waals forces in the first state and after deposition on the receiver.

The flowability of well-dispersed nanoparticles in the second state can be effectively used to provide an image producing material for use in an ink jet printhead. The flow characteristics of Such nanoparticles are akin to that of non-Newtonian fluids. The fluids for which the shear stress is directly proportional to the rate of strain are called Newtonian fluids. A typical Newtonian fluid is water. Because shear stress is directly proportional to the shear strain, a plot relating these variables results in a straight line passing through the origin. The slope of this line is the dynamic viscosity. For non-Newtonian fluids, the slope of the straight line described above is not necessarily constant and it may not pass through the origin. The non-Newtonian behavior of nanoparticles are probably influenced by their Van der Waals type of interaction. The viscosity measurements of some selected nanoparticles (purchased from Nanophase Technologies Corporation, Chicago, USA) were carried out using a Brookfield Viscometer and presented in Table-I. The Brookfield Viscometer is of rotational variety. It measures the torque required to rotate an immersed spindle in a fluid, in this specific case, nanoparticle dispersions (which behave like non-Newtonian fluid). The spindle is driven by a synchronous motor through a calibrated spring. For a given viscosity, the viscous drag, or resistance to flow (indicated by the degree to which the spring winds up), is proportional to the spindle's speed of rotation and is related to the spindle's size and shape (geometry). The drag will increase as the spindle size and/or rotational speed increase. It follows that for a given spindle geometry and speed, an increase in viscosity will be indicated by an increase in the deflection of the spring. Measurements made using the same spindle at different rotational speeds are used to detect and evaluate the rheological properties of any flowable material.

TABLE I

| Spindle Speed (in RPM) | Viscosity (in mPa.s or cps) |
|---|---|
| Nano Tek ® Cerium Oxide (Average Particle Size - 12 nm; Specific Surface Area - 73 m$^2$/gm) | |
| 0.3 | 90,000 |
| 0.6 | 20,000 |
| 1.5 | 10,000 |
| 3.0 | 5,000 |
| 6.0 | 2,000 |
| 12.0 | 750 |
| 30.0 | 200 |
| 60.0 | 100 |
| Nano Tek ® Copper Oxide (Average Particle Size - 33 nm; Specific Surface Area - 29 m$^2$/gm) | |
| 0.3 | 2,000,000 |
| 0.6 | 900,000 |
| 1.5 | 280,000 |
| 3.0 | 140,000 |
| 6.0 | 70,000 |
| 12.0 | 35,000 |
| 30.0 | 14,000 |
| 60.0 | 5,000 |

Nano Tek® registered trademark of Nanophase Technologies Corporation, Chicago, U.S.A.

From the above table It Is clearly visible the important role being played by size of the nanoparticle in influencing the state of the material including both the viscosity in the second state and the nanoparticle specific surface area when deposited on a receiver.

In this invention, nanoparticles of inorganic materials, such as oxides, nitrides, carbides, borides and such used as image producing materials, which behaved like ink in the second state. Also organic nanoparticle materials were used in the ink system as colorants or pigments (see U.S. Pat. No. 5,679,138). The nanoparticles are generally in the dispersed state—the dispersion may be dry or wet. Image producing material which when deposited on a receiver produces an image comprising nanoparticles selected to have an average diameter of less than 500 nm and arranged in the second state so as to be flowable, such nanoparticles being bound to each other by Van der Waals forces in the first state.

In this invention nanoparticle materials are image producing materials. These can be used alone or it can be mixed with colorant nanoparticles, which can be either dye or pigment or both, or with larger particles capable of other interactions with light, such as diffraction. In all cases when a mixture is used for the image-producing materials the mixture must also be effective in the first and second states. The size of the ingredients must be selected so that Van der Waals forces prevent flowing in the first state through an ink jet print head or nozzle but are flowable when subject to a force so as to be deposited on a receiver. For the image producing material mixture the size of the first nanoparticles and second colorant nanoparticles are selected so they absorb light and also scatter and diffract light to produce various shades of true color. However, in all cases the size of the fluidizing particles are 500 nm or less, and they are bound to each other by Van der Waals forces and are also flowable. The size of the nanoparticles are carefully selected so that after nanoparticles are deposited on the receiver, they will produce a predetermined color to an observer.

The receiver is the media where the nanoparticles, individually or as aggregates amongst them or with colorants impinge and stick on to it by Van der Waals forces. In many applications, the forces will be sufficient for permanent adherence. Other arrangements can be used to cause the nanoparticles to be effective in the second state such as by adding energy in the form of heat which melts the nanoparticles. The present invention involves applying a force to the nanoparticles disposed in a hopper to overcome the Van der Waals forces and cause the nanoparticles to be effective in the second state and deliver them to the nozzles where such nanoparticles flow and are deposited on the receiver. As will be described this can be accomplished by atomizing nanoparticles. Also, other techniques can be used Such as by using electrostatic charge or by vibration techniques.

Figure 6:
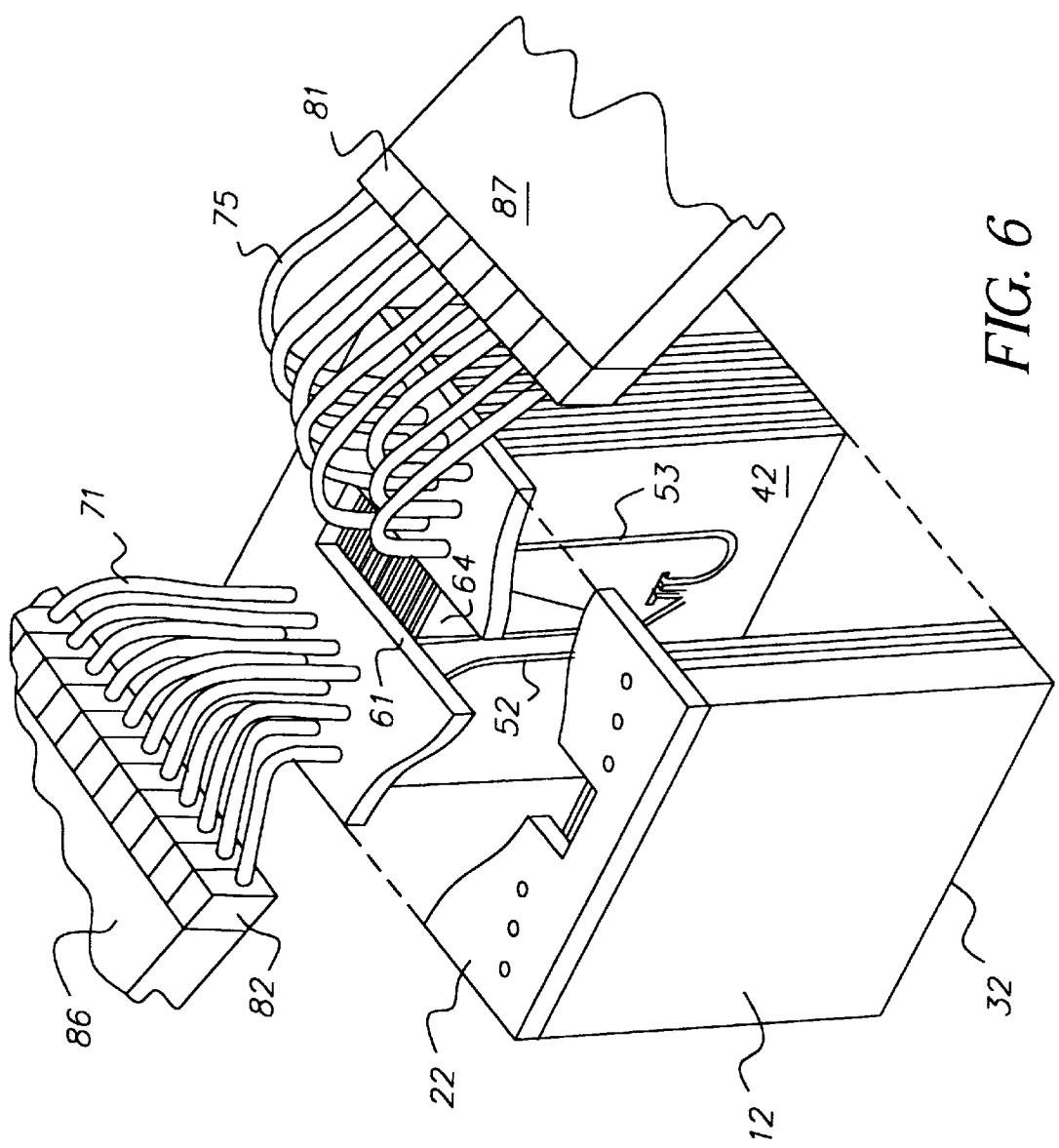
FIG. 6 is an enlarged partial isometric of a second print head design composed of similar thin etched wafers mounted into a head body and having a top orifice plate with pulsing air lines used to control the print materials.
Figure 7:
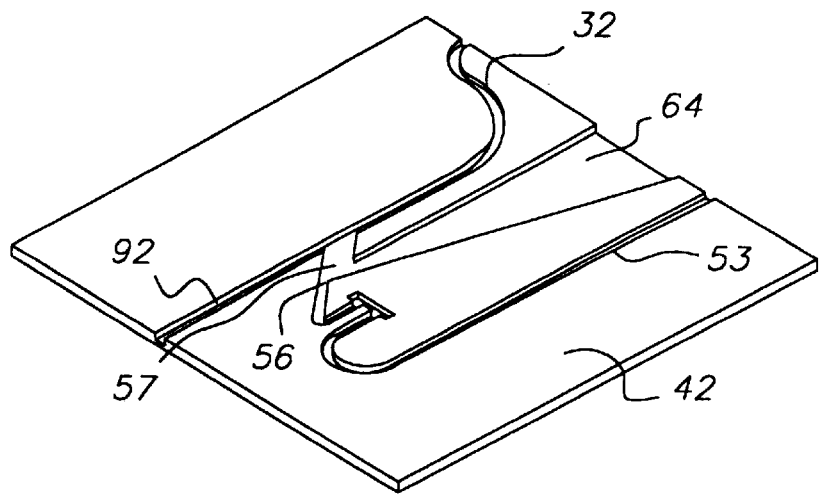
FIG. 7 is an enlarged isometric of the channels embedded on the thin wafer for nanoparticle delivery that constitute individual part of the head shown.
Figure 8:
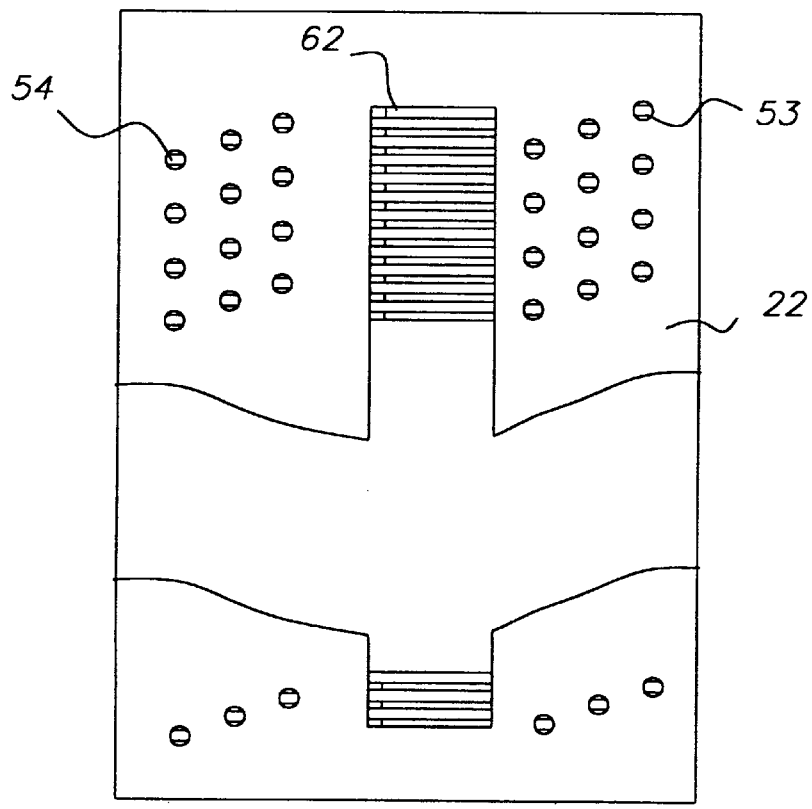
FIG. 8 is an enlarged partial isometric of the ink jet head of FIG. 6 with the top plate having air inlets to drive the printing materials through the printing system over the wafer assemblage.
Figure 9:
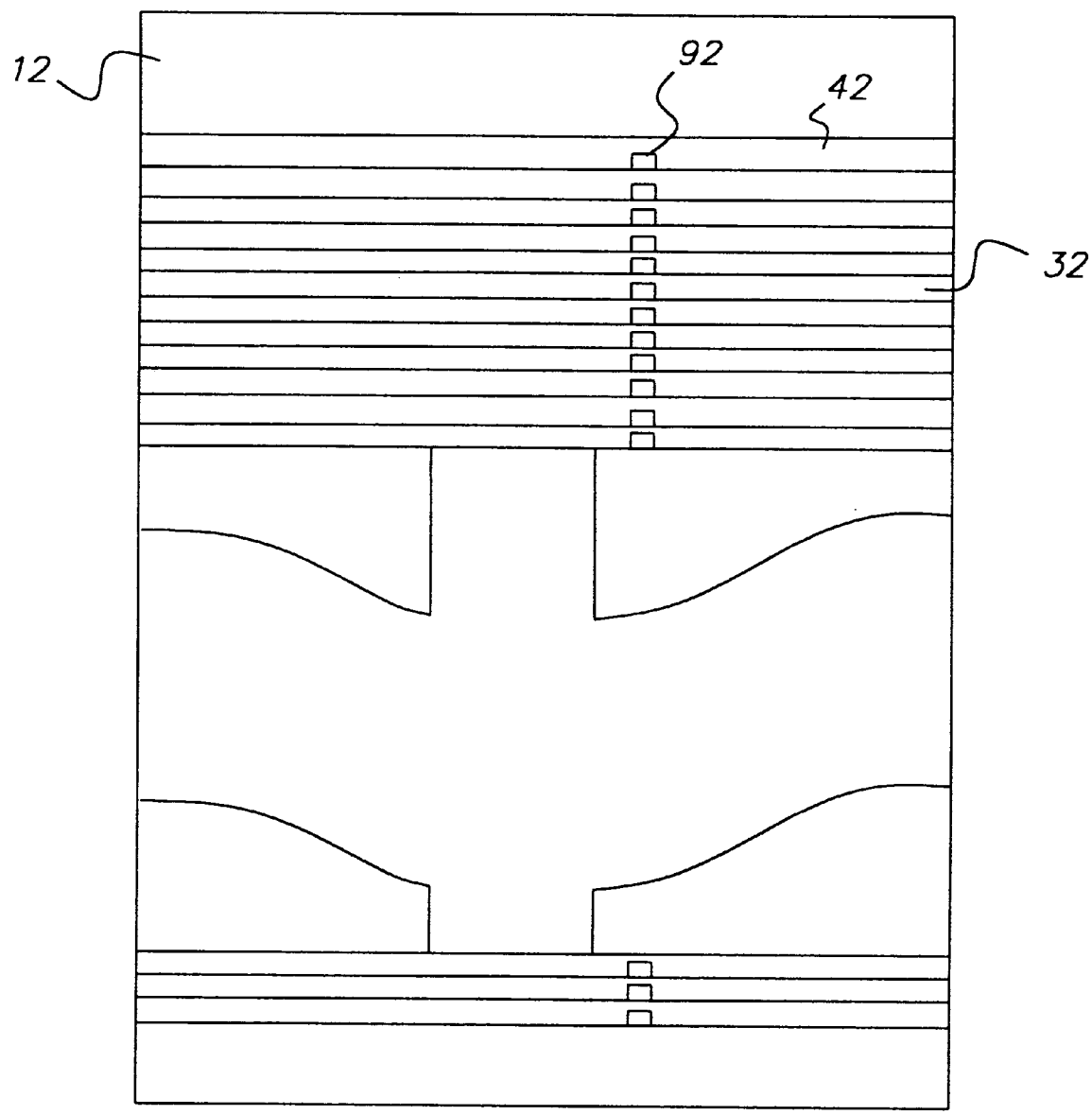
FIG. 9 is a partial plan view of the bottom of the head assembly showing orifices where the printing material exits to the print receiver.

Apparatus for printing an image using image forming materials described above and having nanoparticles less than an average diameter of 500 nm, the apparatus defining a plurality of printing nozzles each of which prints a pixel on a receiver. FIG. 1 is an enlarged partial isometric view of the body 10 of an ink jet head composed essentially of thin etched wafers of any organic and inorganic materials, acting as orifice plates 40 and having top orifice cover 20 and bottom printing surfaces 30. At the end of the bottom printing surfaces, the nozzles 90 are located. The etched (or machined) grooves act as air channels 50, which are connected to the hopper 60 and also to the venturi tubes 55. The hopper 60 is essentially used for receiving the nanoparticles from an outside storage supply, and in which the nanoparticles aggregates are stored. The hopper 60 is connected to the series of venturi tubes 55 through cavities 62 for supply of nanoparticles aggregates to the nozzles 90. A source of air passing the venturi tubes 55, through air supply line 70 which are connected with air control switches 80 to compressed air supply chamber 85 in such a way that nanoparticles are drawn from the cavity and effective in the second state. In this state, the nanoparticles flow and are delivered through the nozzles 90 where they are deposited on to the receiver. The venituri tubes 55 have openings into the air cavities or channels 50 to atomize the nanoparticles or its aggregates mixtures. The atomized nanoparticles are directed towards the nozzles 90 and eventually towards the receiver by controlled air supply through the air cavities by the venturi actions to form pixels.

FIG. 2–FIG. 5 show the details of the construction of the print head described in FIG. 1. FIG. 2 is a partial isometric of the print head with cover 20 removed to show offset of air channels 50 and cavity 62. FIG. 3 is an enlarged isometric of the channels 50 embedded on thin wafer 40 for nanoparticles aggregate/print system and also air delivery. FIG. 4 is a plan view of the orifice cover 20 having air inlets to air channel 50 to drive the ink system. FIG. 5 is a plan view of the bottom showing nozzles 90 to deliver the printing material.

An alternative embodiment of the print head is described in FIGS. 6–9. FIG. 6 shows an enlarged partial isometric of the head body 12 of a print head composed essentially of thin etched wafers of any organic and inorganic materials, acting as orifice plates 42 and having a top orifice cover 22 and bottom printing, surface 32. The etched or machined cavity 64 receives material from hopper 61 and transfer it through venturi 56. The etched or machined grove 53 supplies air to atomize the nanoparticles in cavity 57 (not shown in FIG. 6, but see FIG. 7). The air supply to grooves 53 is effected through air atomization supply lines 75 connected to air atomization control switch 81 which control the air supply from the compressed air supply chamber 87. Another compressed air supply chamber 86 provides air to air delivery channel 52 through air control switch 82 via air control line 71. The air passing through air delivery channel 52 picks up atomized material from cavity 57 and passes it through nozzle 92 onto a printable surface to form pixels.

FIG. 7–FIG. 9 show the details of the construction of the print head described in FIG. 6. FIG. 7 is an enlarged isometric view of the channels embedded on thin wafer 42 for nanoparticle aggregate/print systems with air atomization channel 53 to atomize nanoparticles to be effective in the second state in atomization cavity 57 and air delivery channel 52 to move atomized nanoparticles to nozzle 92. FIG. 8 is an enlarged partial isometric of the ink jet head of FIG. 6 with the top plate 22 having air inlets 53 and 54 to drive the print system over the wafer assemblage. FIG. 9 is a plan view of the bottom showing nozzles 92 where the print media is delivered;

In view of the above description, it is understood that modifications and improvements will take place to those skilled in the art, which are well within the scope of this invention. The above description is intended to be exemplary only wherein the scope of this invention is defined by the following claims and their equivalents.

The invention has been described in detail with particular reference to certain preferred embodiments thereof, but it will be understood that variations and modifications can be effected within the spirit and scope of the invention.

| PARTS LIST |
| --- |
| 10 Head Body |
| 12 Head Body |
| 20 Orifice Cover |
| 22 Orifice Cover |
| 30 Printing Surface |
| 32 Printing Surface |
| 40 Wafer |
| 42 Wafer |
| 50 Air Channel |
| 52 Air Delivery Channel |
| 53 Air Atomization Channel |
| 55 Venturi tubes |
| 56 Venturi tubes |
| 57 Atomization Cavity |
| 60 Hopper |
| 61 Hopper |
| 62 Cavity |
| 64 Cavity |
| 70 Air Supply Line |
| 71 Air Control Line |
| 75 Air Atomization Line |
| 80 Air Control Switch |
| 85 Compressed Air Supply |
| 81 Air Atomization Control Switch |
| 82 Air Control Switch |
| 86 Compressed Air Chamber |
| 87 Compressed Air Chamber |
| 90 Nozzle |
| 92 Nozzle |

What is claimed is:

1. An image producing material comprised of nanoparticles selected to have an average diameter of less than 500 nm and wherein the image producing material is effective in two states, in a first state such nanoparticles aggregate and will not flow through an ink jet printer nozzle and in a second state, when subject to a force, are flowable and can be deposited on a receiver to form an image, such nanoparticles being bound to each other by Van der Waals forces in the first state and after deposition on the receiver.

2. An image producing material mixture which when deposited on a receiver produces an image comprising:

(a) first nanoparticles selected to have an average diameter of less than 500 nm and wherein the image producing material is effective in two states, in a first state such nanoparticles aggregate and will not flow through an ink jet printer nozzle and in a second state, when subject to a force, are flowable and can be deposited on the receiver, such nanoparticles being bound to each other by Van der Waals forces in the first state and after deposition on the receiver; and (b) second colorant particles having a diameter so as to be effective in the first and second states.

3. The image producing material mixture of claim 2 wherein the second colorant particles include nanoparticles selected to have an average diameter of less than 500 nm, and such second colorant particles being bound to each other and to the first nanopalticles by Van der Waals forces in the first state.

4. The image producing material mixture of claim 3 wherein the size of the first nanoparticles and second colorant particles are selected so they diffract light.

5. The image producing material mixture of either claim 2 or 3 wherein the second colorant nanoparticles include a dye, pigment or a light diffracting material.

6. An image producing material which when deposited on a receiver produces an image comprising nanoparticles selected to have an average diameter of less than 500 nm and wherein the image producing material is effective in two states, in a first state, such nanoparticles aggregate and will not flow through an ink jet printer nozzle and in a second state, when subject to a force, are flowable and can be deposited on the receiver, such nanoparticles being bound to each other by Van der Waals forces in the first state and after deposition on the receiver, the nanoparticle size being selected so that after the nanoparticles are deposited on the receiver, they will produce a predetermined color to an observer.

* * * * *